US006952573B2

(12) United States Patent
Schucker et al.

(10) Patent No.: US 6,952,573 B2
(45) Date of Patent: Oct. 4, 2005

(54) WIRELESS RECEIVER WITH STACKED, SINGLE CHIP ARCHITECTURE (75) Inventors: Douglas Schucker, Gilbert, AZ (US); Francis Casey, Chandler, AZ (US); Jeffrey Koeller, Mesa, AZ (US); Jeffrey Ogren, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 195 days.

(21) Appl. No.: 10/665,954

(22) Filed: Sep. 17, 2003

(65) Prior Publication Data

US 2005/0059377 A1 Mar. 17, 2005

(51) Int. Cl.[7] .............................................. H04B 1/28
(52) U.S. Cl. .................... 455/333; 455/292; 455/556.1
(58) Field of Search ................... 455/292, 333, 455/334, 344, 456.1, 556.1, 556.2, 557; 327/403, 404, 564, 565, 567

(56) References Cited

U.S. PATENT DOCUMENTS

| | | | |
|---|---|---|---|
| 4,616,146 A | 10/1986 | Lee et al. | |
| 4,948,991 A | 8/1990 | Schucker et al. | |
| 5,006,486 A | 4/1991 | Schucker | |
| 5,120,998 A | 6/1992 | Seelbach et al. | |
| 5,155,390 A | 10/1992 | Hickman et al. | |
| 5,283,753 A | 2/1994 | Schucker et al. | |
| 5,339,459 A * | 8/1994 | Schiltz et al. ................ | 455/333 |
| 5,359,535 A | 10/1994 | Djaja et al. | |
| 5,440,249 A | 8/1995 | Schucker et al. | |
| 5,461,575 A | 10/1995 | Schucker et al. | |
| 5,473,196 A | 12/1995 | De Givry | |
| 5,852,528 A | 12/1998 | Kori et al. | |
| 5,917,362 A * | 6/1999 | Kohama ...................... | 327/403 |
| 6,055,478 A | 4/2000 | Heron | |
| 6,067,614 A | 5/2000 | Goto | |
| 6,369,751 B1 | 4/2002 | Naruse | |
| 6,369,753 B1 | 4/2002 | Schucker et al. | |
| 6,466,163 B2 | 10/2002 | Naruse et al. | |
| 6,583,758 B2 | 6/2003 | King | |
| 6,754,509 B1 * | 6/2004 | Khan et al. ................ | 455/556.1 |

OTHER PUBLICATIONS

Motorola, Inc., "*Motorola Unveils Latest in Family of Single Chip GPS Devices*", New Device Based on IBM Leading Edge Silicon–Germanium Technology, Chicago, III, Sep. 23, 2002.
Motorola, Inc., "*Fact Sheet MC7200 Integrated Bluetooth™ Radio*".
Motorola Inc., "*Motorola GPS Products—Oncore User's Guide*", Revision 5.0 Aug. 30, 2002.
"*Detection and Reduction of Periodic Jamming Signals in GPS Receivers and Methods Therefor*", U.S. Appl. No. 10/452,753, filed Jun. 2, 2003.

* cited by examiner

*Primary Examiner*—Quochien B. Vuong
(74) *Attorney, Agent, or Firm*—Ingrassia, Fisher & Lorenz (57) ABSTRACT

A monolithic wireless receiver suitable for use in a global positioning system (GPS) or other radio frequency (RF) application suitably includes a mixed-mode integrated circuit and a stacked memory device. The mixed mode integrated circuit appropriately includes a digital portion and an analog portion on a common die. The analog portion implements an RF receiver circuit, and the digital portion includes a signal processor that communicates with the RF receiver. The memory device appropriately communicates with the integrated circuit to store electronic instructions and data for the signal processor. The monolithic receiver may be conveniently integrated into a portable electronics device such as a camera, personal digital assistant (PDA), portable phone or the like to provide location sensing or other RF functionality.

33 Claims, 3 Drawing Sheets

WIRELESS RECEIVER WITH STACKED, SINGLE CHIP ARCHITECTURE

FIELD OF THE INVENTION

The present invention generally relates to wireless systems such as global positioning systems (GPS), and more particularly relates to a wireless receiver with a stacked, single-chip architecture.

BACKGROUND OF THE INVENTION

As portable electronic devices such as wireless phones, personal digital assistants (PDAs), cameras, two-way pagers and the like become increasingly prevalent, manufacturers continue to add new features to such products. In particular, because portable electronics devices are geographically mobile by nature, consumers are now demanding "location based" features such as customized mapping, customized driving directions, emergency locating services and the like that have not been previously available in many commonly-carried devices.

The global positioning system (GPS) has been widely utilized in recent years to provide location-based services such as location tracking. The GPS system, which is operated by the United States Department of Defense, presently includes twenty-four satellites positioned in geosynchronous orbit around the earth that continuously broadcast time and location information to receivers on the ground. By coordinating time and location information from multiple satellites, GPS receivers are able to accurately calculate their precise location on the surface of the earth. GPS receivers are available from many suppliers, including Motorola Inc. of Schaumburg, Illinois.

Although many types of GPS components and GPS-enabled devices are currently available, many of these components and devices have in practice been relatively difficult to integrate into portable phones, PDAs and the like due to the complexity, size, cost and other limitations inherent in many GPS receivers. Accordingly, most phones, PDAs and other portable devices do not presently provide location-based features. It is therefore desirable to create a GPS receiver that is capable of being implemented within a single compact chip or other component suitable for use with portable devices. In addition, it is desirable to create a wireless receiver that can be integrated into mobile products with minimal technical risk, time to market and design cost. Moreover, it is desirable to create a wireless receiver that is efficient in terms of space and electrical power consumption. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION OF THE DRAWINGS

The following detailed description of the invention is merely exemplary in nature and is not intended to limit the invention or the application and uses of the invention. Furthermore, there is no intention to be bound by any theory presented in the preceding background of the invention or the following detailed description of the drawings.

According to various exemplary embodiments of the invention, a wireless receiver (or transmitter, transceiver or the like) is provided within a single microchip or other component. Such a receiver may be easily integrated into mobile products such as phones, PDAs, cameras and the like, since the self-contained receiver does not rely upon external processors, receiver circuitry or the like. In the case of GPS receivers, for example, a single-chip receiver allows mobile devices to readily obtain location-based information, thereby enabling new location-based features for the device. Potential location-based features include cameras that time and location-stamp photos, PDAs that provide maps and real-time navigation and or E-911 compliant mobile phones that are capable of locating friends, family members, nearby restaurants and shops, or other points of interest based upon the location of the device, and/or the like. Other location-based services include product labeling applications that allow objects to determine their locations in space and optionally to transmit that location to a central server or other receiver.

As used herein, the term "wireless device" is intended to encompass any type of transmitter, receiver, transceiver or other device capable of sending, receiving and/or processing radio frequency (RF) signals. Although the discussion herein frequently refers to "receivers" for ease of illustration, it will be appreciated that many types of transmitters, receivers, transceivers and/or other wireless devices could function in an equivalent manner, or could contain equivalent circuits, components and the like.

In various embodiments of the invention, a monolithic wireless receiver suitably includes a mixed-mode integrated circuit that supports both analog and digital circuitry on a common die. The die may be provided in a stacked arrangement with a memory device (e.g. a static or dynamic random access memory (RAM), a flash memory or the like) to store instructions and/or data used by a processor implemented in the digital portion of the common die. Accordingly, the die and memory may be provided within a common chip or other package to create a "receiver on a chip" that may be suitable for GPS and/or other wireless systems.

Figure 1:
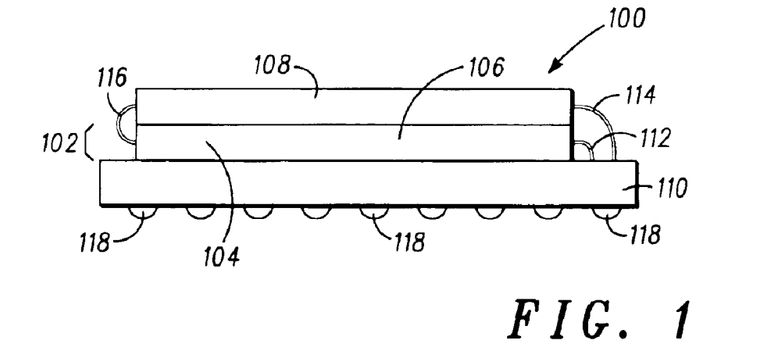
FIG. 1 is a block diagram of an exemplary RF receiver with a stacked architecture.

With reference now to FIG. 1, an exemplary receiver 100 having a stacked architecture suitably includes a mixed-mode die 102 and a memory 108 stacked with each other on a substrate 110. Die 102 supports a digital portion 104 and an analog portion 106 that implement signal receiving and processing functions of receiver 100, whereas memory 108 provides storage for data and/or instructions executed by one or more processors implemented in digital portion 104 of die 102. Because analog portion 106 and digital portion 104 share a common die that can be stacked with memory 108 using conventional integrated circuit (IC) packaging techniques, the entire receiver 100 may be readily contained within a single component or package. The stacked configuration of die 102 and memory 108 appropriately leverages assembly and packaging technologies conventionally used in the production of memory stacks and other integrated circuits to create a new integrated RF receiver that is easily integrated into other devices such as phones, PDAs, cameras or the like.

Substrate 110 is any base member capable of mechanically supporting die 102 and/or memory 108. Substrate 110 may be any type of circuit board, package substrate or the like that may be fashioned from plastic, ceramic, metal or any other conventional material. Substrate 110 suitably provides any number of address pins or balls 118 that provide an external electrical interface to receiver 100. In one embodiment, substrate 110 is a conventional ball grid array (BGA) substrate such as a 64-pin 7×7 mm BGA package having 0.8 mm ball centers, although any other size or type of substrate or chip formulation (e.g. "flip chip", multi-chip module (MCM), chip on board (COB) or the like) could be used in a wide array of alternate embodiments. In various further embodiments, interface functionality on die 102 allows different models of receivers 100 to be formulated on differently-sized substrates 110 without significant modification to die 102, as appropriate. A production version of receiver 100 could be provided on a 64-pin substrate, for example, while a development version using a nearly-identical die 102 could be provided on a 121-pin BGA package (or any other substrate) to provide additional functionality during programming and/or testing. Additional detail about the interface functionality of die 102 is provided below.

Die 102 is any type of integrated circuit, chip, wafer or the like capable of supporting both digital and analog functionality. As described more fully below, the digital portion 104 and analog portion 106 of die 102 appropriately interact to provide an RF receiver on a single chip. Die 102 may be formed from any appropriate semi-conducting material such as silicon, gallium arsenide or the like using any conventional IC fabrication techniques. In one embodiment, die 102 is designed in 0.25 micron SiGe BiCMOS technology available from the IBM Corporation of Armonk, N.Y. Various techniques for implementing and separating analog portion 106 and digital portion 104 are described in FIGS. 2–6 below.

Memory 108 is any static, dynamic, flash or other digital memory capable of storing data and/or instructions for use by components on die 102. In an exemplary embodiment, memory 108 is a bare-die static random access memory (SRAM) available from any number of manufacturers including the Samsung Corp., Micron Inc. and many others, although any other type of memory 108 could be used in alternate embodiments. Memory 108 may store any amount of digital information, but in one embodiment memory 108 is a 256 kbyte SRAM available in a bare-die configuration from the Samsung Corp. By stacking memory 108 with die 102, the overall size of the receiver package may be significantly reduced, thereby resulting in a smaller footprint and easier integration into a portable device.

Die 102 and memory 108 are appropriately connected to each other and/or to substrate 110 using any appropriate technique. The various components may be directly bonded using bond wires 116, 112 and/or 114 to allow power transfer and signal communication between the various components of receiver 100, for example. Bond wires 112, 114 and/or 116 may be fabricated from any electrically or optically conductive material (e.g. copper, aluminum, gold, silver, glass or the like) and may be coupled to die 102, memory 108 and/or substrate 110 using conventional die bonding techniques.

In alternate embodiments, the various components shown in FIG. 1 may be differently combined or interconnected. Memory 108 could be implemented within digital portion 104 of die 102, for example, or elsewhere within receiver 100. In still further embodiments, die 102 and memory 108 are electrically bonded to each other via package pins 118 on substrate 110. Moreover, additional components could be stacked with die 102 and/or memory 108. Such embodiments could include multiple memories (e.g. an SRAM and a flash memory), multiple dies (e.g. a first die providing a GPS receiver and a second die providing a BLUETOOTH or other RF device), or other components (e.g. surface acoustic wave (SAW) or other filters, crystal oscillators and/or the like) as appropriate.

In operation, receiver 100 suitably receives radio frequency (RF) signals at an antenna (shown in FIG. 2) tuned to an appropriate frequency for receiver 100. In an exemplary embodiment, receiver 100 is a GPS receiver that is tuned to the L1 GPS frequency of approximately 1575.42 MHz, although alternate embodiments could be tuned to L2 GPS (1227.6 MHz), Bluetooth, Wi-Fi, wireless telephone or other RF frequencies, or could be responsive to multiple signal frequencies. Signals received at the antenna are provided to an RF receiver circuit in analog portion 106 of die 102, where the signals are de-modulated from the carrier frequency to extract signal data at an intermediate frequency (IF). The de-modulated IF signal may be provided to a signal acquisition module (e.g. a GPS acquisition module (GAM)) within digital portion 104 of die 102 to further extract GPS or other appropriate information from the signal. The extracted information may be further processed at a microprocessor, controller or other processor present within digital portion 104 to provide relevant output information to an external device (e.g. PDA, phone, camera) via signal pins 118. Digital instructions and/or data processed by the RF acquisition module, the digital processor and/or any other components in digital portion 104 may be stored within memory 110, as described more fully below.

Figure 2:
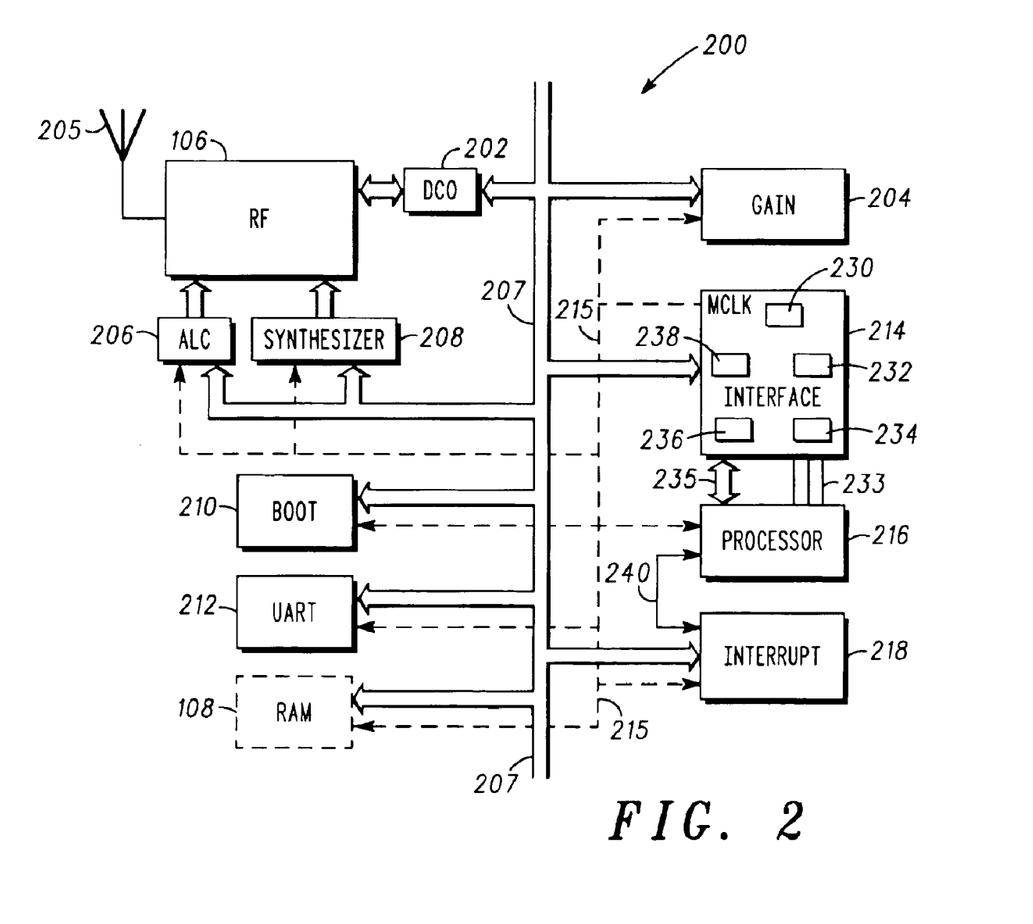
FIG. 2 is a block diagram of an exemplary wireless receiver.

With reference now to FIG. 2, an exemplary receiver 200 suitably includes an analog receiver circuit 106, an acquisition module 204 and a processor 216 communicating with each other and with memory 108 via a system bus 207. Receiver 200 may also include any number of peripheral and/or input/output (I/O) modules such as an interrupt controller 218, a boot module 210, an asynchronous transmitter/receiver (UART) 212 and/or an interface module 214 as appropriate. Generally speaking, receiver circuit 106 appropriately receives RF signals from antenna 205 and demodulates the received signals using a reference clock signal generated by synthesizer 208 to produce the IF signal provided to acquisition module 204 via a digitally controlled oscillator (DCO) 202 and bus 207. Acquisition module 204 appropriately extracts data (e.g. GPS position and/or time information) from the IF signal, and provides the extracted data to processor 216 via bus 207 to extract data that may be provided to an external host or device via interface module 214.

The various modules shown in FIG. 2 and described herein are grouped for purposes of illustration only. In the many practical embodiments, the various modules, functions and features set forth herein may be physically and/or logically arranged in any manner. The signal processing functions carried out by receiver 200, for example, may be shared or divided between DCO 202, acquisition module 204 and/or processor 216 in any manner. In alternate but equivalent embodiments, the analog-to-digital conversion, extraction of data from the IF signal and/or processing of extracted data may therefore be combined into one or more processing modules in any manner different from that described herein. Similarly, the various I/O and peripheral features described herein may be omitted, modified or enhanced in any manner.

Processor 216 is any circuit, device and/or module capable of controlling receiver 200, processing data received via antenna 205 and/or of providing processed data to an external device such as a phone, PDA or the like. In various embodiments, processor 216 is any type of microprocessor, controller, digital signal processor, programmed gate array or the like that is capable of performing the various functions described herein. Processor 216 may be implemented with a microprocessor circuit produced according to the ARM specifications published by ARM Ltd of Sunnyvale, Calif., for example. Various ARM processors are available from a multitude of suppliers, including the ARM7TDMI processor module available from Motorola Semiconductor Products Sector of Austin, Tex., although any other type of processing or control circuitry could be used in a wide array of alternate embodiments.

Processor 216 is appropriately coupled to system bus 207 via an interface module 214. Interface module 214 suitably includes a clock generator 230, an external interface 232, one or more interface registers 234, an address decoder 236 and/or a bus controller 238 as appropriate. Interface registers 234 suitably transfer data 233 to and from processor 216 using conventional processing techniques. Similarly, address decoder 236 translates address information produced by processor 216 to transfer data between processor 216 and the various digital modules coupled to bus 207.

Clock generator 230 appropriately communicates with a crystal or other oscillating signal source (not shown) to produce a clock signal (mclk) 215 that may be provided to one or more of the digital components within receiver 200. Clock signal 215 may be provided as part of system bus 207, for example, or may be separately provided. In various embodiments, clock generator 230 is responsive to state commands from processor 216 to produce clock signals at frequencies that are appropriate for the operating mode of receiver 200. When the analog portion 106 is inactive, for example, the computational demands of receiver 200 are relatively low; clock signal 215 may therefore be provided at a relatively low frequency during such periods to conserve battery power. Similarly, the frequency of clock signal 215 may be increased when additional power is provided or when additional processing bandwidth is desired. Additional detail about clock generator circuit 230 is provided below in conjunction with FIG. 4.

External interface module 214 suitably provides an interface to the portable device or other external host via signal pins 118 (FIG. 1). Interface module 214 includes appropriate timing and latching circuitry to implement an external data and/or address bus to the external device. In various embodiments, interface module 214 is operator-configurable (e.g. through a jumper pin, software control or the like) to communicate with multiple package footprints, as briefly described above. In such embodiments, interface pads or the like can be provided for any number of signal pins 118, with only those pads for the selected footprint being active. In such embodiments, a single chip design can used to produce both developer and user versions of a product that differ only in packaging; that is, the same chip that is provided in an end user configuration can be readily made available in a developer version that supports additional interface pins 118 for addressing, programming, testing or the like with only minimal modification.

Bus controller 238 suitably controls and regulates data traffic on system bus 207 as appropriate. System bus 207 is any serial, parallel or other conductor scheme that allows data transfer between the various digital components in digital portion 104. In an exemplary embodiment, system bus 207 is an internal bus (IBUS) that includes any number of conductors for data and address information, as well as control signals (e.g. mclk signal 215). In an exemplary embodiment, system bus 207 is a 16-bit bus, although any 8 bit, 16 bit, 32 bit or other bus architecture could be used in alternate embodiments. Typically, each digital component interfaces with system bus 207 via an FPGA or other suitable interface circuit. In various embodiments, each component is responsive to a rising or falling edge of mclk signal 215 and/or control signals in system bus 207 to aid in isolating analog portion 106 from digital portion 104, as discussed more fully below.

Processor 216 also interoperates with interrupt controller 218 as appropriate. Interrupt controller 218 suitably provides interrupt request (IRQ) signals 240 to processor 218 as appropriate to process interrupt data from the various digital components communicating on system bus 207. In alternate embodiments, the functionality of interrupt controller 218 is combined with that of bus controller 238.

As briefly described above, acquisition module 204 (shown as a GPS acquisition module (GAM) in FIG. 2) suitably extracts digital data from the demodulated signals received from analog circuit 206. In a GPS embodiment, for example, GAM 204 suitably receives a digital representation of the IF signal provided by receiver circuit 106, and extracts GPS data (e.g. location and/or time) from the sampled signal. Various acquisition modules may be implemented using conventional digital signal processing circuits and techniques. One example of an acquisition module suitable for use in a GPS receiver is described in U.S. Pat. No. 6,583,758, although other acquisition circuits or modules could be used in alternate embodiments.

Various other circuits and/or modules may be implemented within the digital portion of receiver 200. FIG. 2, for example, shows a boot circuit 210 and an asynchronous serial interface 212 that provide boot-time functionality and a programmable interface to processor 216, respectively. Boot circuit 210 typically includes an array of logic gates that interrogate the serial interface and/or other I/O modules at power up (or when receiver 200 is placed in a "discovery mode") to identify devices connected to receiver 200, and to determine appropriate interface techniques for those devices. Similarly, UART 212 provides an interface to processor 216 that allows firmware or other executable code to be downloaded to processor 216 and/or other components from memory 108 via a serial or parallel data connection, or otherwise as appropriate. Other components that may be provided in alternate embodiments of receiver 200 include timer circuitry, "one pulse per second" circuitry, and the like. Receiver 200 may also include another bus interface between system bus 207 and memory 108 to facilitate convenient storage and retrieval of data and instructions for processor 216 and/or acquisition module 204.

Analog portion 106 of receiver 100 suitably provides a "front end" to analog signals received at antenna 205. That is, analog portion 106 contains an RF receiver circuit that demodulates received signals using a reference signal provided by synthesizer 208 to produce an IF signal that can be digitally provided to acquisition module 204. The analog portion 106 of receiver 200 is described more fully below in conjunction with FIG. 3.

Interfacing between the various digital modules (corresponding to digital portion 104 in FIG. 1) and analog receiver circuit 106 may be appropriately provided by an automatic level control circuit (ALC) 206 that provides signal masking/blanking as appropriate, a fractional synthesizer 208 that generates clock signals for circuit 106, and a digitally controlled oscillator (DCO) 202 or the like. ALC circuit 206 is any circuit capable of filtering the output of analog circuit 106 to prevent out-of-range signals. ALC circuit 206 also provides "blanking" functionality to the analog circuit to "null out" or cancel any spurious signals from antenna 205, thereby effectively resetting analog circuit 106. ALC circuit 206 receives control signals from processor 218 via system bus 207, as appropriate. An example of an ALC circuit and an exemplary blanking technique are provided in U.S. patent application Ser. No. 10/452,753 entitled "Detection and Reduction of Periodic Jamming Signals in GPS Receivers and Methods Therefor" and filed on Jun. 2, 2003. Fractional synthesizer 208 is any circuit or device capable of producing appropriate clock signals for analog portion 106. In an exemplary embodiment, synthesizer 208 includes a crystal and circuitry to provide various clock frequencies from about 12 MHz to about 26 MHz, although other frequencies and circuits may be provided in alternate embodiments.

In operation, then, receiver 200 suitably receives, processes and extracts information from signals received at antenna 205. The signals are demodulated at analog RF receiver circuit 106 and provided to an acquisition module 204 via system bus 207. Data extracted from the demodulated signal is provided via system bus 207 to processor 216, which appropriately provides a digital output to a portable device or other host via interface module 214. Accordingly, both analog and digital functionality are provided on a common die 102 (FIG. 1), thereby resulting in a compact, yet fully-functional receiver 200.

One type of GPS receiver that is controlled by a microcontroller affiliated with the host device is shown in U.S. Pat. No. 6,359,753. In practice, however, difficulties have arisen in integrating the full processing functionality of digital portion 104 with analog portion 106 to create a truly integrated wireless device within a single package. In particular, the numerous high-frequency clock signals generally produced for processor 216, acquisition module 204 and the various other digital modules have been shown to interfere with the analog portion of the die. Since the two circuits are now provided on a common die 102, the noise produced by spurious digital signals in analog portion 106 would typically result in undesirable reduced sensitivity to RF signals. Several techniques have been identified, however, that substantially reduce the amount of spurious noise caused by digital portion 104, thereby making complete integration of the digital and analog circuitry on a common die possible. Several of these techniques include the use of common mode rejection techniques, the use of block-enabled filtering, and various modifications to the mechanical design of die 102. Moreover, the physical layout of die 102 may be arranged such that the digital circuits that produce the highest levels of noise (e.g. I/O interfaces, memory interfaces, etc.) are spatially arranged in digital portion 104 to be as far as possible from analog portion 106. Various noise-reduction and/or isolation techniques are discussed below.

Figure 3:
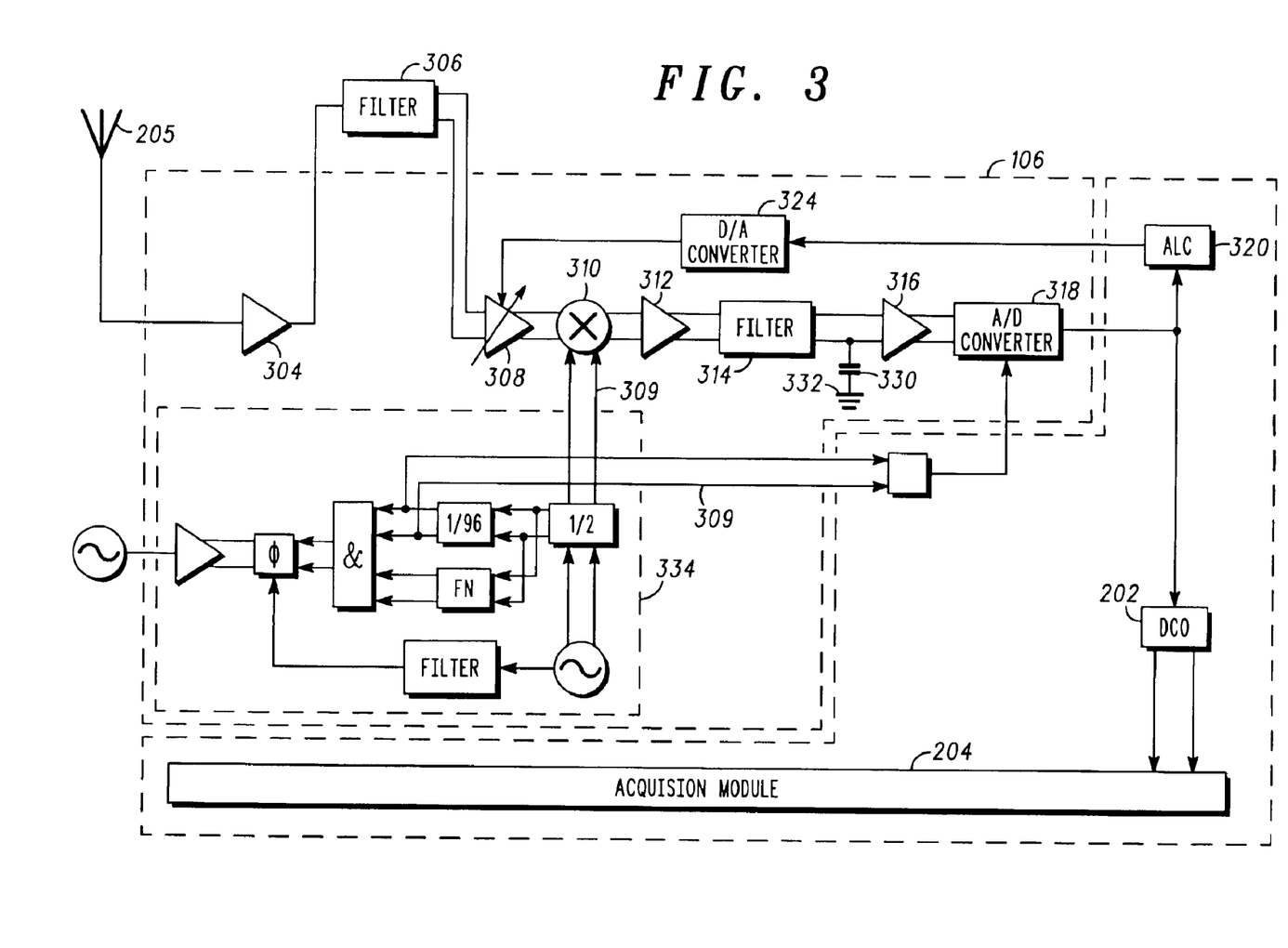
FIG. 3 is a circuit diagram for an exemplary RF receiver circuit.

Referring now to FIG. 3, an exemplary RF receiver circuit in analog portion 106 suitably includes one or more amplifiers 304, 308 and 314, a mixer 310, an oscillator circuit 334, and an output stage including an analog-to-digital converter (ADC) 318. Signals received from antenna 205 are appropriately amplified by a low-noise amplifier 304 and provided to a bandpass filter 306 that is tuned to pass signals within a frequency band around the carrier frequency of interest (e.g. the GPS L1 frequency of 1575.42 MHz). Because received RF signals may be very faint (e.g. GPS signals received indoors), amplifer 304 typically provides about 20 dB or so of gain to the received signal to increase the sensitivity of receiver circuit 106. The amplified and filtered circuit is then provided to a mixing stage that includes a variable gain amplifier 308, an analog mixer 310, and one or more frequency shaping filters 314 and/or amplifiers 312, 316. As shown in FIG. 3, the analog signal may be processed in a differential manner throughout some or all of analog portion 106. Because spurious noise from digital portion 104 (FIG. 1) typically infiltrates both sides of a differential signal approximately equally, comparisons of the differential signals suitably compensate for the noise using conventional common mode rejection techniques.

The differential signal emanating from filter 306 is processed as appropriate to create in IF signal that can be transmitted and further processed by acquisition module 204 (FIG. 2). In the exemplary embodiment shown in FIG. 3, the signal is amplified to a desired level using variable gain amplifier 308, which adjusts its gain based upon feedback from the output of analog section 106. The amplified signal is mixed with an appropriate signal from oscillator circuit 334 to demodulate the received signal from its carrier wave. Oscillator circuit 334 is any circuit capable of receiving an input signal from fractionated synthesizer 208 and of processing the signal to produce the appropriate demodulating signal 309 at mixer 310 and/or to produce an appropriate clock signal 311 for ADC 318. In the embodiment shown in FIG. 3, oscillator circuit 334 suitably produces an oscillating signal 309 of about 1570 MHz, as well as a clock signal to ADC 318 of about 16 MHz, as appropriate, although the actual frequencies and techniques for producing the various frequencies will vary widely from embodiment to embodiment.

The demodulated/mixed signal resulting from mixer 310 is appropriately filtered by filter 314 and amplified by amplifiers 312 and/or 316 to further shape the IF signal into a desired waveform. To further reduce the effects of spurious noise from digital portion 104 of die 102, one or more of amplifiers 308, 312 and/or 316 may include block enabled filtering 330, as shown coupled to one of the differential inputs of amplifier 316 in FIG. 3. Each block-enabled filter suitably includes a capacitor or other element capable of removing high-frequency noise from the amplifier input. Although shown as a single capacitor in FIG. 3, the actual filters may include any number of parallel and/or resistive, capacitive and/or inductive elements capable of filtering spurious signals. Filter 330 may be electrically located between an analog amplifier and a conductive element 332 that is coupled to processor 216 or other circuitry on digital portion 104 to effectively create a short circuit for high-frequency signals, thereby preventing the signals from becoming amplified in analog portion 106. Filter 330 is therefore tuned to remove spurious signals resulting from clock signals or the like in digital portion 106, and the harmonics of those signals.

The processed analog IF signal is converted to a digital equivalent by ADC 318. ADC 318 is any type of analog-to-digital converter such as a pipeline-type converter or the like having any level of resolution (e.g. 4 bits, 8 bits, etc.). The digital equivalent signal is typically provided to acquisition module 204 (FIG. 2) via digitally controlled oscillator 202, which synchronizes the digital output of analog portion 106 using a phase or delay locked loop, or the like. The digital output from ADC 318 may also be processed by level control circuit 206 to provide blanking and/or level control functionality, as described above. In such embodiments, the digital output of ALC 206 is typically converted to an analog equivalent signal by a digital-to-analog converter (DAC) on analog portion 106, and the resulting converted analog signal is used as a control input to variable gain amplifier 308.

Accordingly, analog portion 106 suitably receives, demodulates and converts analog signals received on antenna 205. Spurious noise from digital portion 104 is appropriately reduced through the use of differential signaling and/or block enabled filters 330. The circuitry shown in FIG. 3 is merely exemplary, however, and any alternate GPS or RF front end circuit having any number of alternate or additional components could be used in a wide array of equivalent embodiments.

The effects of digital noise upon analog portion 106 may be further reduced by adjusting the various clock signals propagating in digital portion 104 such that neither the signals nor any harmonics of the signals lie within the frequency band processed by analog circuit 106. In an receiver that processes L1 GPS signals, for example, receiver 200 primarily processes input signals having a frequency of about 1575.42 MHz or so, plus or minus about 10 MHz. This frequency band may be primarily defined by filter 306, or by any other component(s) of analog circuit 106. By designing the digital baseband clock signals and their harmonics to fall outside of this range, spurious noise caused by the clock signals can be effectively filtered from analog circuit 106. Clock signals may be adjusted in digital portion 104 through several techniques. By using logic gates that are sensitive to relatively slow edge rates, for example, noise can be effectively reduced.

Figure 4:
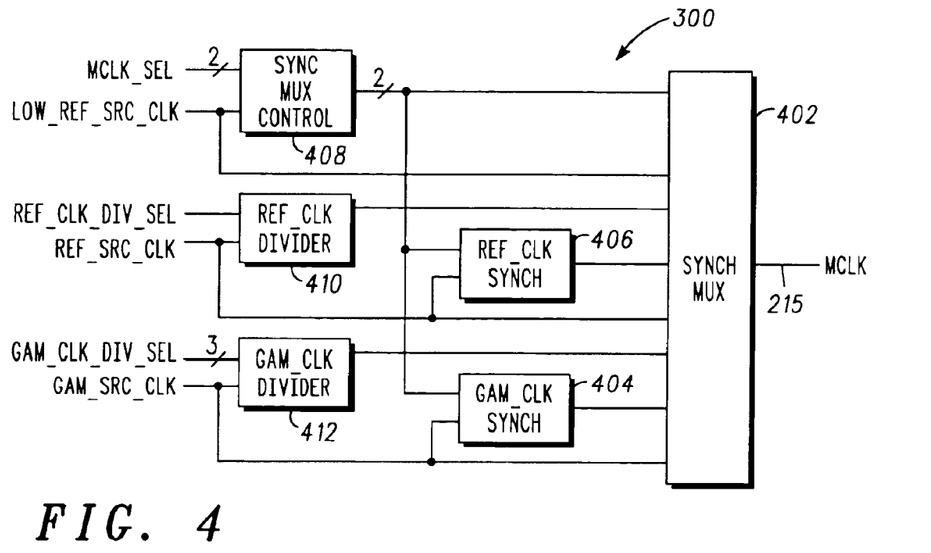
FIG. 4 is a block logic diagram for an exemplary clock signal generation scheme.

Similarly, the clock signals themselves may be selected so as to lie outside of the analog frequency band of interest, as described above. With reference now to FIG. 4, an exemplary circuit 400 for generating clock signals 215 having various frequencies suitably includes one or more signal divider circuits 410, 412, one or more synchronizing circuits 404, 406 and a synchronous multiplexer 402. Divider circuits 410, 412 suitably receive clock inputs from a crystal or other reference source (ref_src_clk) and/or from acquisition module 204 (gam_src_clk) or the like. These signals may be divided or otherwise adjusted in response to divider select (ref_clk_div_sel and gam_$_2$clk_divsel) signals received from processor 216, acquisition module 204, clock generator 230 and/or another appropriate source to dividers 410, 412. Circuit 400 also receives an internally or externally provided low frequency source clock signal (low_ref_src_clk) that is provided to multiplexer controller 408. In an exemplary embodiment, the low frequency source clock signal is received from a real time clock oscillator, and has a frequency of about 32.768 KHz, although other sources and frequencies could be used in alternate embodiments.

Multiplexer controller 408 appropriately provides a single or multi-bit control signal to multiplexer 402 to place the appropriate clock signal on the mclk signal line 215. One or more outputs from controller 408 may also be provided to synchronization circuits 404, 406, which suitably synchronize the outputs of dividers 412, 410 (respectively) with the low frequency reference clock signal as appropriate. In an exemplary embodiment, synchronization circuits 404, 406 are conventional flip-flop or latch circuits. Synchronous multiplexer 402 suitably selects between the low-frequency source signal, the outputs of dividers 410, 412 and the outputs of synchronization circuits 404, 406 to place the appropriate output clock signal on mclk line 215. During an exemplary normal operating mode, processor 218 typically operates at a speed of about 14 MHz, and acquisition module 204 operates at a clock speed of about 70 MHz, although other values could be used in alternate embodiments. Moreover, the system clock 215 or any other clock signals may be produced as a function of one or more externally-provided signals, as appropriate. Such functionality may be provided in conjunction with circuit 400, for example, or may otherwise be provided by clock generator 230, DCO 202 or the like (FIG. 2). In an exemplary embodiment, one or more switches in DCO 202 are used to provide switching between various externally-applied clock signals.

Circuit 400 may also be used to select a high-frequency clock signal during normal operation and/or a low frequency clock signal for low power operation. By operating receiver 200 (FIG. 2) at the low frequency reference rate (e.g. about 32.768 KHz), processor 218 operates at a relatively slow rate, thereby conserving electric power. While processor 218 is operating at the low reference rate, it may also be put into a conventional "sleep mode", thereby further conserving power. Processor 218 may be removed from sleep mode by accelerating mclk signal 215, by providing an appropriate interrupt signal to processor 218, or by any other technique. In a further embodiment, a non-resetable sleep mode may be created through highly synchronous gate design that allows digital circuits to retain their values even when the clock signal slows or stops, thereby eliminating the need to store data before entering sleep mode and the need to reload the data after exiting sleep mode.

Figure 5:
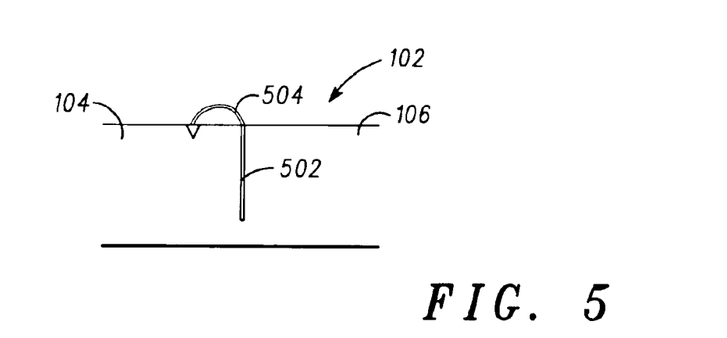
FIG. 5 is a side view of an exemplary die for a monolithic integrated circuit.
Figure 6:
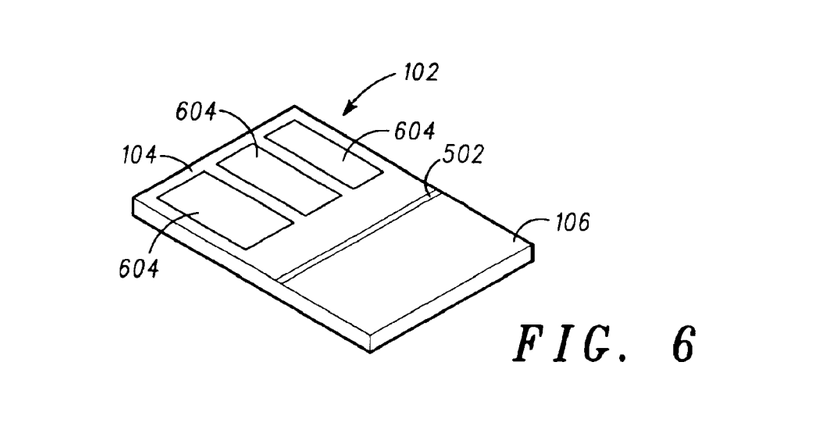
FIG. 6 is a perspective view of an exemplary die for a monolithic integrated circuit.

Other techniques for preventing signals on digital portion 104 from producing noise in analog portion 106 involve improvements to the spatial layout of die 102. As briefly mentioned above, the modules in digital portion 104 that generate the most noise may be physically located on die 102 to be as far away from analog portion 106 as possible. Moreover, additional physical isolation may be provided by a ground trench and/or a Faraday cage about digital portion 104. Referring now to FIG. 5, an exemplary die 102 suitably includes a trench 504 formed between digital portion 104 and analog portion 106. Trench 504 may be created using any conventional technique (e.g. sawing, etching and the like) and may be filled with a conductive material such as gold, silver, aluminum, copper or the like. In a further embodiment, trench 504 is coupled to an electrical ground on die 102 to further sink spurious signals absorbed by trench 504. Trench 504 appropriately extends most, but not all, of the way through die 102 to prevent as many signals as possible from traversing into analog portion 106 of die 102. With reference now to FIG. 6, signals propagating in digital portion 104 may be further isolated by creating a Faraday cage around at least a portion of digital portion 104. A Faraday cage may be created, for example, by sputtering, depositing or otherwise forming conductive regions 604 on the exterior surface of digital portion 104. These conductive regions 604 may be formed from aluminum, copper, gold, silver, alloy or any other conductive material. Although the conducting regions 604 are shown as "plates" in FIG. 6, alternate embodiments may make use of grid, mesh or other patterns as appropriate.

By using the various techniques described herein, both analog and digital circuitry for an RF/GPS receiver may be incorporated into a common mixed-mode die 102 without sacrificing performance of the receiver. The receiver may be made even more compact by placing the mixed-mode die 102 in a stacked arrangement with an SRAM or other memory 108. Accordingly, the signal isolation techniques described herein allow a complete RF/GPS receiver to be fashioned with a stacked, single-chip architecture. This compact design may be readily incorporated into a wide array of portable electronics and other products to implement any number of enhanced functionalities, including location based services and the like.

While at least one exemplary embodiment has been presented in the foregoing detailed description of the invention, it should be appreciated that a vast number of variations and equivalents exist. For example, while certain aspects of the invention have been described herein with reference to a GPS receiver, the concepts disclosed herein may be readily adapted to equivalent circuits and devices such as transmitters, transceivers and/or receivers that may be used in any type of RF or other wireless communication, including Bluetooth, Wi-Fi, wireless telephone or the like. It should be appreciated that the embodiments contained herein are only examples, and are not intended to limit the scope, applicability, or configuration of the invention in any way. Rather, the foregoing detailed description provides a convenient road map for implementing exemplary embodiments of the invention. Various changes may be made in the function and arrangement of elements described in any of the exemplary embodiments without departing from the scope of the invention as set forth in the appended claims and their legal equivalents.

What is claimed is:

1. A monolithic wireless device, the wireless device comprising:
    a mixed-mode integrated circuit having a digital portion and an analog portion on a common die, wherein the analog portion comprises a radio frequency (RF) receiver circuit and wherein the digital portion comprises a signal processor in communication with the RF receiver circuit; and
    a memory device in electronic communication with the mixed-mode integrated circuit, wherein the memory device is configured to store electronic instructions and data for the signal processor.

2. The wireless device of claim 1, wherein the memory device is stacked with the mixed mode integrated circuit on a substrate.

3. The wireless device of claim 2 wherein the memory device is direct bonded to the mixed mode integrated circuit.

4. The wireless device of claim 2 wherein the memory device is electrically coupled to the mixed mode integrated circuit by package pins disposed on the substrate.

5. The wireless device of claim 1 wherein the RF receiver circuit operates within a frequency band and wherein the digital portion comprises a clock signal having a clock frequency that is provided to the signal processor.

6. The wireless device of claim 5 wherein the clock frequency is configured such that neither the clock frequency nor any harmonics of the clock frequency lie within the frequency band.

7. The wireless device of claim 6 wherein the RF receiver circuit comprises a filter tuned to remove a harmonic of the clock frequency from an analog signal propagating in the analog portion.

8. The wireless device of claim 5 wherein the RF receiver circuit comprises:
    an amplifier configured to receive an analog signal from an antenna;
    a mixer configured to mix the analog signal with an oscillator signal having a frequency within the frequency band; and
    an analog-to-digital converter configured to provide a digital equivalent of the analog signal to the signal processor.

9. The wireless device of claim 8 wherein the amplifier is a differential amplifier comprising at least two differential inputs.

10. The wireless device of claim 9 wherein the RF receiver circuit further comprises a filter coupled to one of the at least two differential inputs and tuned to remove at least a portion of the clock frequency from an analog signal propagating in the analog portion.

11. The wireless device of claim 1 wherein the analog portion and the digital portion are at least partially separated by a conducting trench in the common die.

12. The wireless device of claim 11 wherein the conducting trench is connected to an electrical ground.

13. The wireless device of claim 1 wherein the digital portion comprises a plurality of conducting members proximate to a surface of the common die to thereby form a Faraday cage about the digital portion.

14. A monolithic receiver for a global positioning system (GPS), the receiver comprising:
    a substrate;
    a mixed-mode integrated circuit coupled to the substrate and having a digital portion and an analog portion on a common die, wherein the analog portion comprises an RF receiver circuit operating within a frequency band and wherein the digital portion comprises a signal processor in communication with the RF receiver circuit, wherein the digital portion comprises a clock signal having a clock frequency provided to the signal processor, and wherein the clock frequency is selected such that neither the clock frequency nor any harmonics of the clock frequency lie within the frequency band; and
    a memory device stacked with the mixed-mode integrated circuit opposite the substrate and configured in electronic communication with the mixed-mode integrated circuit, wherein the memory device is configured to store electronic instructions and data for the signal processor.

15. The receiver of claim 14 wherein the analog portion and the digital portion are at least partially separated by a conducting trench in the common die, and wherein the conducting trench is connected to an electrical ground.

16. A wireless receiver provided on a common die in communication with an antenna, the wireless receiver comprising:
    a system bus disposed on the common die;
    an analog portion coupled to the system bus and comprising a radio frequency (RF) receiver circuit configured to receive an analog signal from the antenna and to provide a digital representation of the analog signal therefrom;
    an acquisition module configured to communicate with the RF receiver circuit via the system bus and to thereby receive the digital representation of the analog signal, wherein the acquisition module is further configured to process the digital representation to thereby extract data from the analog signal;
    a processor coupled to the system bus, wherein the processor is configured to control the RF receiver and the acquisition module, and to process the data from the acquisition module to thereby provide an output of the wireless receiver.

17. The wireless receiver of claim 16 further comprising an interface module coupling the processor to the system bus.

18. The wireless receiver of claim 17 wherein the interface module comprises a bus controller, a clock generator and an external interface for the wireless receiver.

19. The wireless receiver of claim 18 wherein the clock generator is operable to produce a system clock signal to the processor and the acquisition module.

20. The wireless receiver of claim 16 further comprising an interrupt controller disposed on the common die and coupled to the data bus, wherein the interrupt controller is operable to provide interrupt requests received via the system bus to the processor.

21. The wireless receiver of claim 16 further comprising an interface from the system bus to an external memory stacked with the common die.

22. The wireless receiver of claim 16 further comprising a boot module comprising a sequence of logic gates in communication with the system bus and operable to provide a boot sequence implemented in the sequence of logic gates to the processor.

23. The wireless receiver of claim 16 further comprising an automatic level control (ALC) module coupling the analog portion to the system bus, wherein the ALC module is configured to providing blanking and level control to the RF receiver in response to signals received from the processor via the system bus.

24. The wireless receiver of claim 16 further comprising clock generating circuitry configured to produce a system clock signal for the processor and the acquisition module as a function of an external reference.

25. The wireless receiver of claim 16 further comprising clock generating circuitry configured to produce a system clock signal for the processor and the acquisition module as a function of a selected one of a plurality of external references.

26. The GPS receiver of claim 16 further comprising a memory in a stacked configuration with the common die.

27. The wireless receiver of claim 26 further comprising a second memory in the stacked configuration with the common die.

28. The wireless receiver of claim 16 further comprising a filter in a stacked configuration with the common die.

29. A monolithic die for a wireless receiver stacked with a memory and electrically coupled to an antenna, the monolithic die comprising:

a system bus disposed on the die;

an analog portion coupled to the system bus and comprising a radio frequency (RF) receiver circuit configured to receive an analog signal from the antenna and to provide a digital representation of the analog signal therefrom;

an acquisition module configured to communicate with the RF receiver circuit via the system bus and to thereby receive the digital representation of the analog signal, wherein the acquisition module is further configured to process the digital representation to thereby extract data from the analog signal;

a processor coupled to the system bus, wherein the processor is configured to control the RF receiver and the acquisition module, and to process the data from the acquisition module to thereby provide an output of the wireless receiver.

30. A monolithic wireless device contained within a package, the device comprising:

a substrate disposed within the package;

a mixed-mode integrated circuit coupled to the substrate and having a digital portion and an analog portion on a common die; and a memory stacked with the mixed-mode integrated circuit within the package, wherein the memory is in electronic communication with the mixed-mode integrated circuit to implement the wireless device.

31. The wireless device of claim 30 wherein the memory is direct bonded to the mixed mode integrated circuit.

32. The wireless device of claim 30 wherein the memory is electrically coupled to the mixed mode integrated circuit by package pins disposed on the substrate.

33. A monolithic wireless device contained within a package, the device comprising:

means for receiving wireless signals;

means for processing the wireless signals received at the receiving means, the processing means comprising a digital portion and an analog portion on a common die; and means for storing data and instructions for the processing means, wherein the storing means is stacked with the processing means within the package.

* * * * *